United States Patent
Davies

(10) Patent No.: US 7,821,925 B2
(45) Date of Patent: Oct. 26, 2010

(54) TRAFFIC DISTRIBUTION TECHNIQUES UTILIZING INITIAL AND SCRAMBLED HASH VALUES

(75) Inventor: Michael Davies, Santa Monica, CA (US)

(73) Assignee: Fulcrum Microsystems, Inc., Calabasas, CA (US)

( * ) Notice: Subject to any disclaimer, the term of this patent is extended or adjusted under 35 U.S.C. 154(b) by 941 days.

(21) Appl. No.: 11/668,133

(22) Filed: Jan. 29, 2007

(65) Prior Publication Data

US 2008/0181103 A1 Jul. 31, 2008

(51) Int. Cl.
*H04L 12/54* (2006.01)

(52) U.S. Cl. .................. 370/229; 370/230; 370/419; 709/238

(58) Field of Classification Search ........... None
See application file for complete search history.

(56) References Cited

U.S. PATENT DOCUMENTS

| | | | |
|---|---|---|---|
| 6,363,396 B1 * | 3/2002 | Klots et al. ................ 1/1 |
| 6,430,170 B1 * | 8/2002 | Saints et al. ............ 370/335 |
| 7,190,696 B1 * | 3/2007 | Manur et al. ............ 370/392 |
| 7,327,748 B2 * | 2/2008 | Montalvo et al. ........ 370/412 |
| 7,346,706 B2 * | 3/2008 | Rezaaifar et al. ........ 709/239 |
| 2007/0280258 A1 * | 12/2007 | Rajagopalan et al. .... 370/395.3 |

OTHER PUBLICATIONS

Knuth, D., "The Art of Computer Programming: Hashing", vol. 3: Sorting and Searching:, Chapter 6.4, Addison Wesley, 1973.
Pearson, P., "Fast Hashing of Variable-Length Text Strings", vol. 33, No. 6, Communications of the ACM, Jun. 1990, pp. 677-680.
"Cyclic Redundancy Check," Wikipedia, the free encyclopedia, pp. 1-7, http://en.wikipedia.org/wiki/CRC32.
B. Volz et al., "DHC Load Balancing Algorithm," Network Working Group, RFC 3074, Feb. 2001, pp. 1-7, http://www.scit.wlv.ac.uk/rfc/rfc30xx/rfc3074.html.
"Examples of Hash Functions for Hash Table Lookup", http://burtleburtle.net/bob/hash/examhash.html, pp. 1-4.

* cited by examiner

*Primary Examiner*—Jayanti K Patel
*Assistant Examiner*—Matthew Campbell
(74) *Attorney, Agent, or Firm*—Weaver Austin Villeneuve and Sampson LLP

(57) ABSTRACT

Methods and apparatus are described for assigning data units to a plurality of groups. A key is generated for each of the data units such that the keys corresponding to associated ones of the data units are identical. An initial hash value is generated for each of the keys. A number of techniques are described for then deterministically scrambling the initial hash values such that small bit changes in the keys will typically produce stochastically large changes in the final hash values. The data units are mapped to specific ones of the groups with reference to the scrambled hash values.

19 Claims, 4 Drawing Sheets

TRAFFIC DISTRIBUTION TECHNIQUES UTILIZING INITIAL AND SCRAMBLED HASH VALUES

BACKGROUND OF THE INVENTION

The present invention relates to functions for distributing data traffic over a set of "bins," and more specifically, to traffic distribution functions which employ hash functions to distribute data traffic among a set of ports or interfaces.

In many applications, packet-based switching devices (also referred to herein as switches) must statistically distribute traffic over a set of forwarding interfaces, ports, or bins in order to achieve a greater aggregate transmission bandwidth than a single interface can provide. This practice is known variously as "link aggregation," "port trunking," "port teaming," or "load sharing." The goal of these techniques is to aggregate N ports together in order to achieve N times as much transmit bandwidth than a single port provides. To achieve this, each packet that the switching device forwards must be mapped to one of N ports in a uniform manner, i.e., no one port can be systematically preferred over another.

The ideal method for guaranteeing uniform load balancing over the aggregated ports requires maintaining utilization state for each port. Packets can then be assigned to the least loaded port, thereby ensuring optimal uniformity. Unfortunately, this solution has large implementation costs and therefore is unsuitable for highly integrated switching devices.

On the other hand, the simplest method for guaranteeing uniform load balancing is to randomly assign each packet to an egress port. This solution has a very cheap implementation cost, but it violates important "flow ordering" constraints present in many applications. Such constraints require that packets sharing certain properties, e.g., as derived from their content, be forwarded along the same path through the network of switches.

The standard solution to this problem that is both cheap to implement and maintains flow ordering is to assign packets to egress ports based on the result of a "hash function" operation. A hash function maps an input "key" to an output hash value having fewer bits. The hash value is then mapped or "binned" using a binning function which maps the hash value to a port number between 0 and N−1.

Each packet's key is generated in such a way that two packets belonging to the same flow have the same key. For example, a simple definition of a flow depends only on the packet's source and destination addresses: (src_address, dst_address). In such a case the key would be constructed as a concatenation of these two fields. The definition of a flow may be refined further by including other properties of the packet such as, for example, addresses belonging to higher-layer protocols or quality-of-service classifications.

A good hash function for a high-performance, highly integrated switching device is characterized by good uniformity, small implementation area, and low computation time (i.e., low latency). Uniformity can be assessed by comparison to a random assignment. That is, if two randomly selected keys differ, then there should be a 50% probability that their hash values will be different. Hash functions have been proposed that provide very good uniformity when measured in this manner. However, few of these functions measure well on implementation area or latency. This is commonly the result of iterative properties inherent in the functions requiring that each byte of the input key be processed in a serial manner. In a high-performance hardware implementation, these iterations generally must be unrolled into unique logic structures. This leads to a large amount of area and a long computation time.

The generally recognized hash function suitable for high-performance, high-integration hardware implementations is the CRC, or Cyclic Redundancy Check. The CRC is commonly defined in an iterative manner, but in its unrolled form is equivalent to a tree of binary XOR operations over sets of input key bits. A generalization of the CRC that covers other (simpler) commonly used hardware hash functions is simply an XOR tree per hash value bit:

$$\text{hash\_value}[i] = \text{key}[F[i,1]] \wedge \text{key}[F[i,2]] \wedge \ldots \wedge \text{key}[F[i,n\_i]]$$

where i=0 ... M−1, and F[i,j] describes a set of n_i key fan-in bits per hash_value bit i. Each key bit F[i,j] is XOR-ed together (implemented as a tree structure for low area and latency) to produce hash_value[i].

Fewer implementation options are available for the binning stage that follows the hash function. Generally, one of two functions are used: Modulo or Division. When N is a power of two, these functions are essentially equivalent, i.e., they both represent taking the port number directly from a subset of the hash_value bits. For example, modulo binning over two ports represents assigning the egress port from hash_value[0]. Division binning in this example would assign the egress port from hash_value[M−1]. When N is not a power of two, a simple arithmetic calculation is performed.

Hash functions such as the CRC defined in terms of an XOR tree over key bits provide good uniformity when evaluated over random keys. However, when evaluated over real-world network packets, severe non-uniformity corner cases are sometimes seen. These arise because real-world keys are not distributed in a uniform, random manner. Commonly the addresses contained in the keys, e.g., MAC or IP addresses, are sequential in nature. Unfortunately, any hash function implemented as an XOR-tree over the key bits, followed by either modulo or division binning gives very bad uniformity when evaluated over such key sets. These non-uniformities are a significant problem for highly-integrated switches because they lead to a need for increased on-chip packet buffering, a scarce and expensive resource on such devices.

A software based algorithm known as Pearson's hash function has been shown to have better performance with regard to sequential key non-uniformity than a standard XOR-tree implementation. Pearson's algorithm employs a randomly initialized static mapping table to map each byte of each hash value to a new byte for a new hash value. However, while Pearson's approach has been shown to be effective in software solutions, implementing its iterative table lookup in highly integrated, high-performance hardware is problematic in terms of both area and latency.

SUMMARY OF THE INVENTION

According to the present invention, techniques are provided which address the sequential key non-uniformity problem described above. According to specific embodiments, methods and apparatus are provided for assigning data units to a plurality of groups. A key is generated for each of the data units such that the keys corresponding to associated ones of the data units are identical. An initial hash value is generated for each of the keys. A scrambled hash value is deterministically generated from each of the initial hash values. The scrambled hash values are characterized by better uniformity than the initial hash values. The data units are mapped to specific ones of the groups with reference to the scrambled hash values.

According to another specific embodiment, a switching device is provided having a plurality of interfaces for receiving and transmitting data packets. Key generation circuitry is operable to generate at least one key for each of the data packets such that the at least one key corresponding to each of selected ones of the data packets associated with a packet flow is identical to the at least one key corresponding to each other selected data packet associated with the packet flow. Hash value generation circuitry is operable to generate at least one initial hash value for each of the keys. Bit scrambling circuitry is operable to deterministically generate a scrambled hash value from each of the initial hash values. The scrambled hash values are characterized by better uniformity than the initial hash values. Mapping circuitry is operable to map the packets to specific ones of the interfaces with reference to the scrambled hash values.

According to a more specific embodiment, the key generation circuitry is operable to ensure symmetry for both directions of each packet flow by sorting fields associated with source and destination information associated with the packets. According to another embodiment, the hash value generation circuitry is operable to generate multiple, statistically independent initial hash values for each data packet.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

It turns out that the basic problem with conventional solutions which just employ an XOR-tree-based hash function is that there is a static dependence between a particular output hash value bit and a particular set of the input key bits. When sequential keys occur, only a small number of bits on the input keys are changing. Therefore, when bin assignments are made by looking only at a small subset of the output hash value bits, the static dependence results in a non-uniform distribution which, in some cases, is severe.

Figure 1:
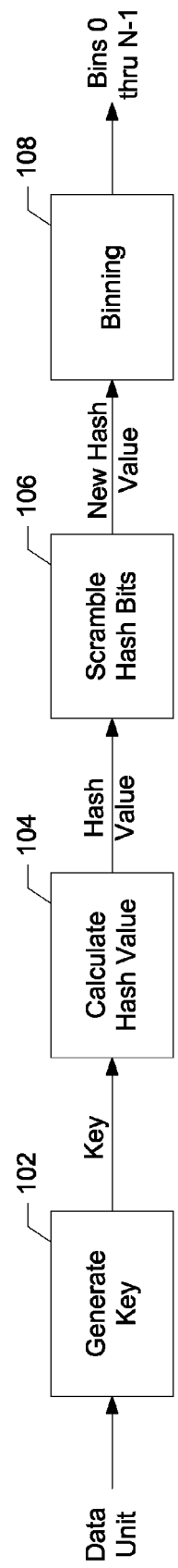
FIG. 1 is a block diagram illustrating operation of a specific embodiment of the present invention.

Therefore, various embodiments of the invention involve application of one or more randomization functions to the bits of a hash value to break the static dependence of particular hash value bits on sets of input key bits while maintaining good random key uniformity and low hardware implementation cost. This is illustrated in FIG. 1 in which a key generator 102 generates a key from information in a received unit of data, e.g., source and destination IP addresses in a TCP/IP packet. A hash calculation stage 104 calculates a hash value, e.g., a CRC32 value, which is passed to a bit scrambling stage 106 to generate a new hash value. As used herein, the term "bit scrambling" refers to any function applied to the bits of a hash value which introduces some randomization to address the sequential key non-uniformity problem.

Bit scrambling stage 106 employs a deterministic function to ensure that packets from the same flow are still mapped to the same port. An optional binning stage 108 maps the new hash value to one of N bins. As will be discussed, the approach shown in FIG. 1 preserves the highly desirable area and latency advantages of conventional approaches which employ simple hash functions such as those constructed from XOR trees, while significantly reducing sequential key non-uniformities.

The functional blocks represented in FIG. 1 may be implemented in a wide variety of contexts using a wide variety of technologies without departing from the scope of the invention. That is, embodiments of the invention may be implemented in processes and circuits which, in turn, may be represented (without limitation) in software (object code or machine code), in varying stages of compilation, as one or more netlists, in a simulation language, in a hardware description language, by a set of semiconductor processing masks, and as partially or completely realized semiconductor devices. The various alternatives for each of the foregoing as understood by those of skill in the art are also within the scope of the invention. For example, the various types of computer-readable media, software languages (e.g., Verilog, VHDL), simulatable representations (e.g., SPICE netlist), semiconductor processes (e.g., CMOS, GaAs, SiGe, etc.), and device types (e.g., packet switches) suitable for designing and manufacturing the processes and circuits described herein are within the scope of the invention.

Embodiments of the invention are described herein with reference to switching devices, and specifically with reference to packet or frame switching devices. According to such embodiments and as described above, some or all of the functionalities described may be implemented in the hardware of highly-integrated semiconductor devices, e.g., 1-Gigabit and 10-Gigabit Ethernet switches, IP routers, DSL aggregators, switch fabric interface chips, and similar devices. Alternatively, the present invention may be implemented in software at higher levels of the network stack, e.g., in TCP/IP protocols, or even at the application layer for some implementations. The present invention should therefore not be limited to packet or frame switching implementations.

A first set of embodiments employs a bit scrambling function which applies a bit roll operation to an XOR tree output value (xor_hash_value). The number of bits to roll by (xor_roll_value) is determined by the output of another XOR-tree hash function calculated on the same key. If the desired bit width of the final hash value (hash_value) is M, then xor_roll_value requires ceil(log 2(M)) additional XOR-calculated bits. The final hash value is then given by:

$$\text{hash\_value} = ((\text{xor\_hash\_value} \gg \text{xor\_roll\_value}) \mid (\text{xor\_hash\_value} \ll (M - \text{xor\_roll\_value}))) \& (2^M - 1)$$

The cost of this solution is quite small. That is, its additional area cost is roughly linear in M and its latency cost is roughly logarithmic in M. Note that the "downward" sense of the bit roll in the above equation is arbitrary. A more general representation of this solution is written in terms of a permutation function p: [0 . . . M−1]→[0 . . . M−1], in which:

$$\text{hash\_value}[i] = \text{xor\_hash\_value}[p((i+\text{xor\_roll\_value}) \% M)]$$

where the downward roll case above has p(i)=i.

Because the bits of the primary hash value are rolled in a manner which is dependent on the initial key value, this approach deals with the static dependence issue discussed above while maintaining a deterministic relationship with the initial key value. According to a specific embodiment in which the primary hash value is a 12-bit value, four additional hash value bits are calculated to effect a full scrambling of the 12-bit value.

It should be noted that the bit roll described above is merely an example of what may be done with the additional hash value bits according to various embodiments of the invention. That is, embodiments of the invention are contemplated which employ any of a wide variety of permutation functions of which bit rolling is one example. Some of these permutation functions may require additional hash value bits to modulate the scrambling behavior. Others, such as a randomly initialized static mapping function p: [0 . . . M−1]→[0 . . . M−1], do not.

A second set of embodiments takes advantage of the fact that the non-uniform distribution problem is particularly bad when the binning of the hash values is done among a number of bins which is a power of 2. That is, algorithms which bin over N options (where N is a power of 2) typically rely on a very small number of bits values and thus exacerbate the static dependence issue described above. For example, when placing values in one of two bins, an algorithm only needs to look at the value of a single bit, e.g., the least significant bit, to make the bin assignment. Unfortunately, for sequential keys, this results in the non-uniformity described above.

Therefore, according to this set of embodiments, a sufficient number of lower order bits (as determined with reference to the number of bins) of the hash value are deterministically mapped to new, randomly generated values, thereby breaking the dependence which results in the non-uniformity. So, for example, to support up to 16-way binning, only the four lower order bits of the primary hash value need to be "scrambled" in this manner. For a 12-bit hash value, this requires maintaining a relatively small 4,096 by 4-bit table to map all possible values of the primary hash value to one of the 16 bins.

According to specific embodiments, this set of solutions employs a randomly-initialized static mapping table P: [0 . . . $2^M-1$]→[0 . . . $2^{log\ 2(N\_max)}-1$], where N_max is the maximum power-of-two value of N to be supported. So, for example, for a 12-port switch, N_max would be equal to 16. P is initialized randomly such that for each k in [0 . . . $2^M/N\_max-1$], P(i)≠P(j) for i≠j and k·N_max≤i, j<(k+1)·N_max. This constraint specifies that each successive block of $2^{log\ 2(N\_max)}$ entries in the table is a permutation of the sequence {0, 1, 2, . . . , $2^{log\ 2(N\_max)}-1$}. With this table, assuming modulo binning, the final hash value is mapped based on the XOR-tree output value as:

$$\text{hash\_value}[M-1:\log2(N\_max)] = \text{xor\_hash\_value}[M-1:\log2(N\_max)]$$
$$\text{hash\_value}[\log2(N\_max)-1:0] = P(\text{xor\_hash\_value})$$

The following pseudocode describes an algorithm for generating tables that satisfy the requirements of such embodiments:

```
FOR i = 0 .. 2^M / N_max - 1 :
    FOR j = 0 .. N_max - 1 :
        hit[j] = 0
    ENDFOR
    FOR j = 0 .. N_max - 1 :
        DO :
            k = Random(N_max)
        WHILE (hit[k] == 1)
        P[i * N_max + j] = k
        hit[k] = 1
    ENDFOR
ENDFOR
```

These solutions have the advantage of not requiring additional XOR-tree bits to be calculated and its latency cost remains roughly logarithmic in M. On the other hand, its area cost does not scale as well as the bit roll solution described above, i.e., it scales roughly as $2^M$. However for practical values of M the additional area required remains relatively small in proportion to the hash function's XOR tree structure.

According to various embodiments which include a binning stage, binning may be accomplished using a wide variety of techniques to map hash values to different bins. According to specific embodiments, either modulo or division binning may be employed.

In some implementations it is desirable for a switching device's hash function to be "symmetric." That is, when endpoint A sends a packet to endpoint B, the hash value should be the same as when endpoint B sends a similar packet to A. If H represents the hash function and the simple address pair key example is used, this property can be expressed as:

$$H(\text{src\_address}, \text{dst\_address}) = H(\text{dst\_address}, \text{src\_address})$$

It will be understood that, for more complicated keys, this property must hold when all relevant source and destination fields are swapped.

According to specific embodiments of the invention, symmetry is ensured for the hash functions described above by sorting the bytes of the fields in the key that will be swapped from sender to receiver. This technique is simple to implement and maintains good hashing uniformity. Other techniques may also be employed such as, for example, XOR-ing the fields together and replacing the original fields with the results of the XOR operation.

It should be noted that the portion of the fields sorted and the order in which they are sorted may vary as long as the same key is generated for the same two end points regardless of which is the source and which is the destination. For example, the entire fields (e.g., source and destination addresses) can be sorted as units, although this operation can become expensive to implement for large fields (e.g., the network addresses of the IPv6 protocol). Alternatively, smaller units than bytes (e.g., 4-bit "nibbles") may be used for sorting. In addition, the order in which the fields are sorted (e.g., high to low, low to high, etc.) may vary as long as any pair of end points yield the same key value.

According to some embodiments, packet switching devices are provided in which symmetry is supported independently on multiple layers of the network stack, e.g., at layer 2 with respect to source and destination MAC addresses, at layer 3 with respect to source and destination IP addresses, and at layer 4 with respect to TCP ports. This is particularly advantageous in Clos architectures, spanning tree architectures, and so-called "fat tree" architectures in which both directions of a flow are bound to the same port to enable particular architectural features. Independent hashing using keys generated from information at multiple network layers allows such architectures to better take advantage of entropy or randomness available in the system and to thereby take better advantage of the aggregate bandwidth of the switches deployed in such architectures.

Figure 2:
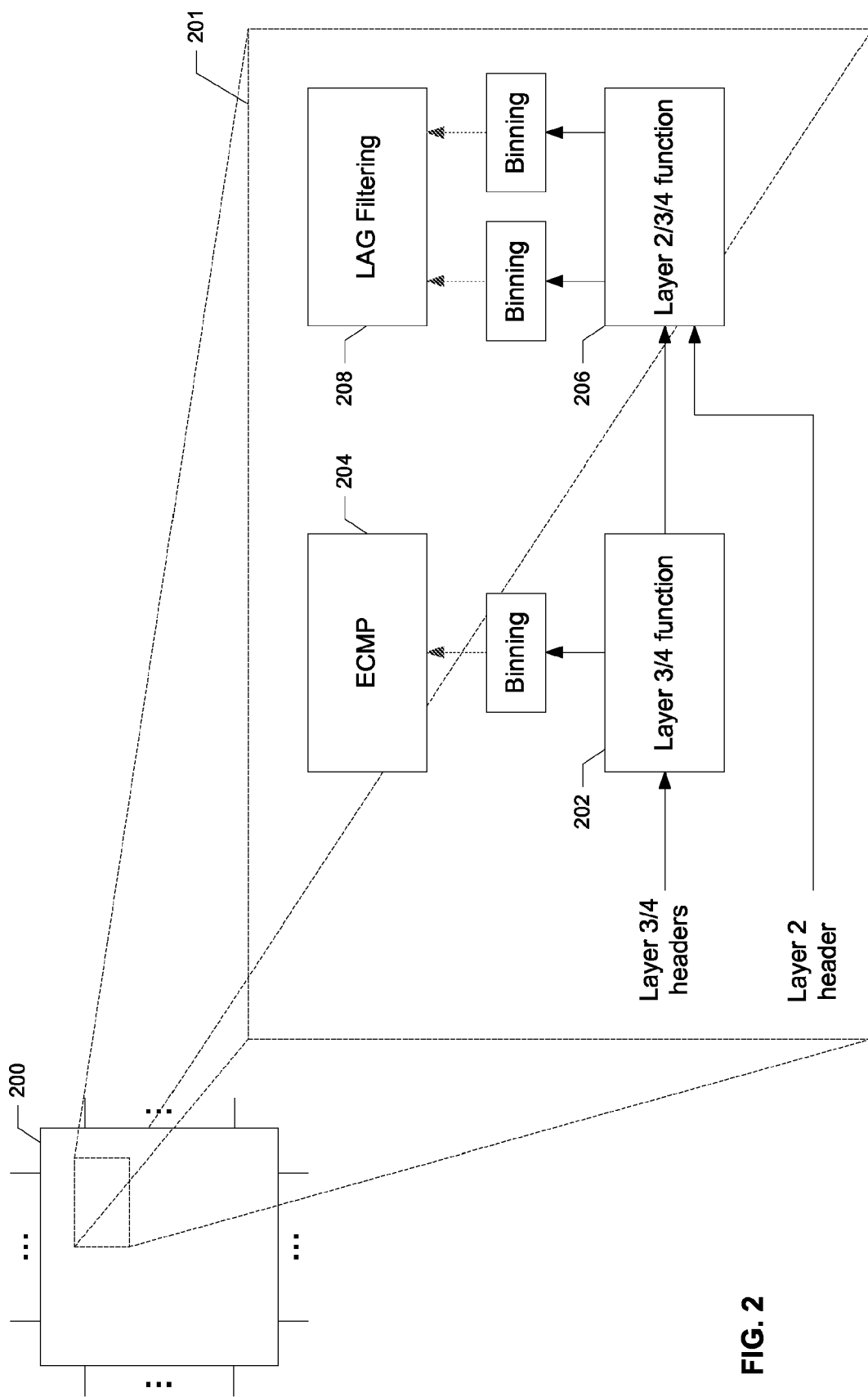
FIG. 2 is a block diagram of a portion of a switching device implemented according to a specific embodiment of the invention.

According to a specific embodiment shown in FIG. 2, a packet switching device 200 is provided which includes traffic distribution circuitry 201 which generates multiple independent hash values per packet using information in layers 2, 3, and 4 of the network protocol stack. A first hash value (202) is calculated in accordance with a specific embodiment of the invention using one or more fields from each of the layer 3 and 4 headers of each packet. This hash value is used to facilitate equal-cost multi-path (ECMP) routing (204). A second hash value (206) is calculated using the first hash value and at least one field from the packet's layer 2 header. This hash value is then used to facilitate single-chip and multi-chip link aggregation (LAG) (208) (filtering and pruning, respectively).

Figure 3:
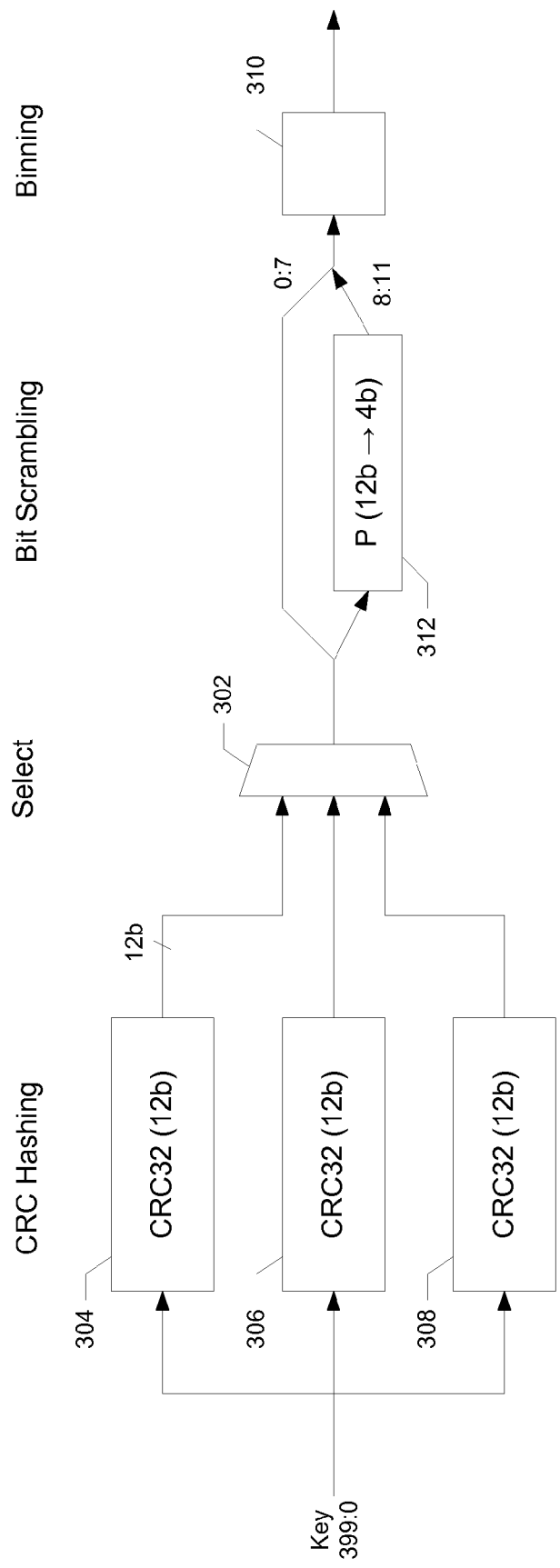
FIG. 3 is a block diagram illustrating implementation of a hash function in accordance with a specific embodiment of the invention.
Figure 4:
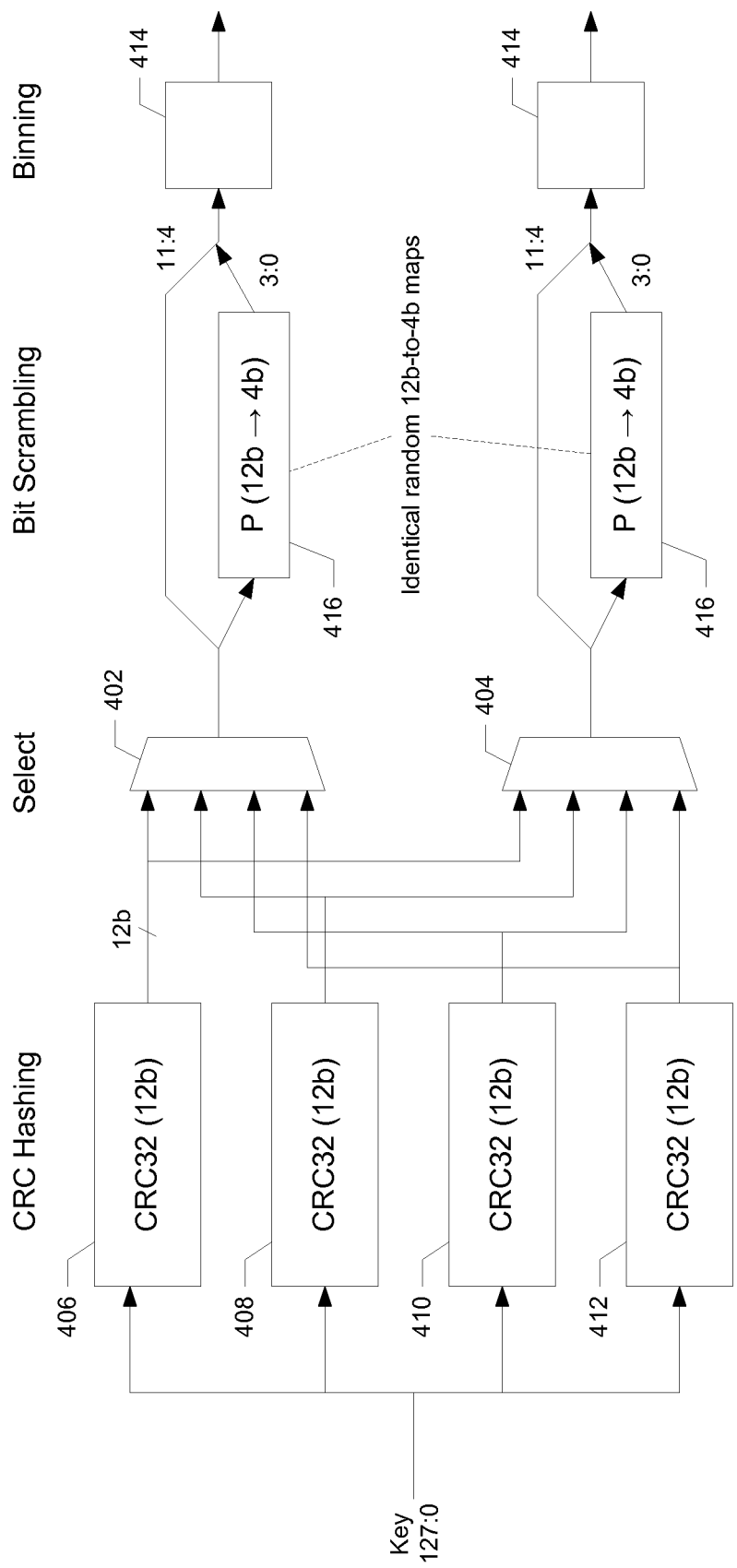
FIG. 4 is a block diagram illustrating implementation of a hash function in accordance with another specific embodiment of the invention.

According to a specific embodiment illustrated in FIGS. 3 and 4, the first and second hash values of FIG. 2 are each derived from multiple hash values. Referring to FIG. 3, the first hash value (202) is selected (as represented by multiplexer 302) from among three 12-bit hash values (304, 306, and 308) corresponding to different sets of 12 bits from one or more CRC32 polynomials. The second hash value is actually two hash values selected (via multiplexers 402 and 404) from among four 12-bit hash values (406, 408, 410, and 412) each of which also corresponds to different sets of 12 bits from one or more CRC32 polynomials.

According to specific embodiments of the invention, the input keys to these hash functions are constructed in a configurable manner in order to provide the following features: (1) symmetry, i.e., the hash value remains the same when the source and destination fields are swapped; (2) static field dependence, i.e., support for including a specific set of header fields in the hash function; (3) dynamic field dependence based on packet or frame type, i.e., certain fields can be omitted or included when a frame is IPv4/IPv6.

The implementations of FIGS. 2-4 are useful, for example, in a multi-chip switch fabric in which it is desirable to load balance frames over different ECMP sets or LAGs in a statistically independent fashion. For example, the same hash function should not be used to distribute traffic over the second-layer links of a 3-tier fat tree as the first-layer links. Thus, the implementations described above calculate multiple independent hashes for a given packet or frame, with configuration settings determining which of the hashes applies to a given packet and switching device. That is, as shown in FIGS. 3 and 4, each switching device in such a fabric can apply a maximum of three independent hash values to a given packet or frame, i.e., one (of three independent choices) for ECMP, and two (of four independent choices) for link aggregation.

According to specific embodiments, binning of the selected hash value is performed using division binning (e.g., 310) for ECMP and modulo binning (e.g., 414) for link aggregation. Division binning (also known as hash threshold binning) has the advantage of providing better stability of the bin mappings when the number of bins is changed. Both functions provide equally balanced hash binning. According to a specific embodiment, division binning 310 is given by: index=base+(hash*bin_count)/4096. According to a specific embodiment, modulo binning 414 is given by: index=base+hash % bin_count.

According to a specific embodiment, the 36 bits of hash values 304, 306, and 308 used for ECMP are calculated using two 32-bit CRC functions and a 12-bit permutation table as follows:

H34[31:0] = CRC32(0xEDB88320, Bytes[0..49])
H34[35:32] = CRC32(0x82F63B78, Bytes[0..49])[3:0]

According to a specific embodiment, the 48 bits of hash values 406, 408, 410, and 412 used for link aggregation pruning and filtering is calculated in a similar manner using an additional sixteen layer-2 bytes from the frame header as follows:

H234[31:0] = CRC32(0xEDB88320, Bytes[0..15]) ^ UseL34 * H34[31:0]
H234[35:32] = CRC32(0x82F63B78, Bytes[0..15])[3:0] ^ UseL34 * H34[35:32]
H234[47:36] = CRC32(0x82F63B78, Bytes[0..15])[15:4] ^ UseL34 * H34[11:0]

According to a specific embodiment, the bottom four bits of the hash values of FIG. 4 are replaced by permutation table 416 as described above. Permutation table 416 (of which there are two identical instantiations) may be generated, for example, using the pseudocode algorithm provided above. By contrast, for the division binning used in FIG. 3, it is the uppermost four bits (i.e., 11:8) of the hash values which are substituted with the output of permutation table 312. Permutation table 312 may also be identical to permutation tables 416.

While the invention has been particularly shown and described with reference to specific embodiments thereof, it will be understood by those skilled in the art that changes in the form and details of the disclosed embodiments may be made without departing from the spirit or scope of the invention. For example, embodiments of the invention have been described herein with reference to specific techniques for "scrambling" at least some of the bits of a hash value. It should be understood that the present invention encompasses any technique by which the bits of a hash value may be further randomized to deal with sequential key non-uniformity. For example, the bits of a hash function could be scrambled using a linear feedback shift register (LFSR). In another example, the M bits of a hash value, e.g., the 12 bits of a CRC32 output, could be randomly permuted to another M-bit value. Other variations within the scope of the invention will be apparent to those of skill in the art.

And more generally, the techniques described herein are not restricted to packet switching applications. Rather, the present application is more widely applicable to virtually any context in which distribution techniques based on hash functions exhibit undesirable non-uniformities.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A switching device, comprising:
   a plurality of interfaces for receiving and transmitting data packets;
   key generation circuitry for generating at least one key for each of the data packets such that the at least one key corresponding to each of selected ones of the data packets associated with a packet flow is identical to the at least one key corresponding to each other selected data packet associated with the packet flow;
   hash value generation circuitry for generating at least one initial hash value for each of the keys;
   bit scrambling circuitry for deterministically generating a scrambled hash value from each of the initial hash values, the scrambled hash values being characterized by better uniformity than the initial hash values; and
   mapping circuitry for mapping the packets to specific ones of the interfaces with reference to the scrambled hash values.

2. The switching device of claim 1 wherein the key generation circuitry is operable to generate the at least one key for each data packet with reference to source information and destination information associated with each data packet.

3. The switching device of claim 2 wherein the key generation circuitry is operable to ensure symmetry for both directions of each packet flow by sorting fields associated with the source and destination information.

4. The switching device of claim 1 wherein each of the data packets includes header information for each of a plurality of network layers, and wherein the key generation circuitry is operable to generate multiple keys for each data packet with reference to the corresponding header information for more than one of the network layers.

5. The switching device of claim 4 wherein the hash generation circuitry is operable to generate multiple initial hash values for each of the multiple keys for each data packet.

6. The switching device of claim 4 wherein at least one of the multiple keys for each data packet is derived with reference to a combination of the header information for more than one of the network layers.

7. The switching device of claim 4 wherein each of the scrambled hash values corresponding to the multiple keys for each data packet are used to facilitate one of a plurality of packet routing functions, the packet routing functions including any of equal-cost multi-path routing, local link aggregation, and distributed link aggregation.

8. The switching device of claim 1 wherein the hash value generation circuitry is operable to generate multiple initial hash values for each data packet from a single key, the multiple initial hash values for each data packet being statistically independent.

9. The switching device of claim 8 wherein the multiple initial hash values for each data packet are derived from at least one larger hash value.

10. The switching device of claim 1 wherein the at least one initial hash value comprises at least a portion of an XOR tree hash value.

11. The switching device of claim 1 wherein the bit scrambling circuitry is operable to generate the scrambled hash values by performing a bit roll operation on the initial hash values.

12. The switching device of claim 1 wherein the bit scrambling circuitry is operable to generate the scrambled hash values by processing the initial hash values using a linear feedback shift register.

13. The switching device of claim 1 wherein the bit scrambling circuitry is operable to generate the scrambled hash values by mapping the initial hash value through a randomly initialized permutation table.

14. The switching device of claim 1 wherein each of the initial hash values comprises a plurality of bits, and wherein the bit scrambling circuitry operates on only a subset of the plurality of bits for each of the initial hash values, the subset of bits being determined with reference to a number of the interfaces.

15. The switching device of claim 14 wherein the bit scrambling circuitry employs a randomly-initialized mapping table, each successive block of $2^{\log 2(N\_max)}$ entries in the mapping table comprising a permutation of a sequence $\{0, 1, 2, \ldots, 2^{\log 2(N\_max)}-1\}$, where N_max corresponds to a maximum number of the interfaces supported.

16. The switching device of claim 1 wherein the mapping circuitry comprises one or more of modulo binning circuitry or division binning circuitry.

17. The switching device of claim 1 wherein the hash value generation circuitry comprises a first number of instances operable to generate the first number of initial hash values, and wherein the bit scrambling circuitry comprises a second number of instances operable to generate the second number of scrambled hash values, wherein the second number is less than or equal to the first number.

18. An apparatus for assigning data units to a plurality of groups, the apparatus comprising circuitry configured to:
   generate a key for each of the data units such that the keys corresponding to associated ones of the data units are identical;
   generate an initial hash value for each of the keys;
   deterministically generate a scrambled hash value from each of the initial hash values, the scrambled hash values being characterized by better uniformity than the initial hash values; and
   map the data units to specific ones of the groups with reference to the scrambled hash values.

19. A computer program product for assigning data units to a plurality of groups, comprising at least one non-transient computer readable medium having computer program instructions stored therein which are operable when executed by a computer to:
   generate a key for each of the data units such that the keys corresponding to associated ones of the data units are identical;
   generate an initial hash value for each of the keys;
   deterministically generate a scrambled hash value from each of the initial hash values, the scrambled hash values being characterized by better uniformity than the initial hash values; and
   map the data units to specific ones of the groups with reference to the scrambled hash values.

* * * * *